C. H. BERRY.
ABSOLUTE PRESSURE GAUGE.
APPLICATION FILED DEC. 10, 1920.

1,414,854.

Patented May 2, 1922.

Inventor
C. Harold Berry,

By Shepherd & Campbell
Attorney

UNITED STATES PATENT OFFICE.

CHARLES HAROLD BERRY, OF DETROIT, MICHIGAN.

ABSOLUTE-PRESSURE GAUGE.

1,414,854.      Specification of Letters Patent.      Patented May 2, 1922.

Original application filed May 12, 1920, Serial No. 380,879. Divided and this application filed December 10, 1920. Serial No. 429,734.

*To all whom it may concern:*

Be it known that I, CHARLES HAROLD BERRY, a citizen of the United States, residing at 368 Clarendon Avenue, Detroit, in the county of Wayne and State of Michigan, have invented certain new and useful Improvements in Absolute-Pressure Gauges, of which the following is a specification, reference being had therein to the accompanying drawings.

This application is a division of my copending application Serial Number 380,879, filed May 12, 1920, and is intended to embrace claims founded upon the manual setting of the compensating mechanism in contradistinction to the automatic setting thereof under the influence of a barometer.

Figure 1:
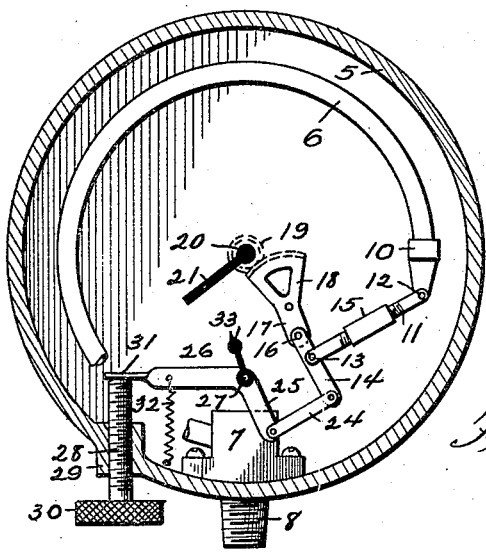
Figure 2:
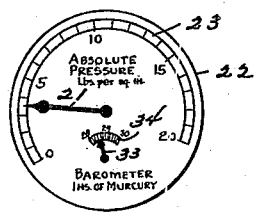

In the accompanying drawing:

Figure 1 is a view of the gauge constructed in accordance with the invention with the casing of the gauge in section and with the pointer and its distinctions in elevation; and Fig. 2 is a reduced face view of the dial of the gauge.

Referring to the drawing it will be seen that the casing 5 houses a pressure actuated element 6, which may be a Bourdon tube; said tube receiving pressure through a block 7 that is provided with a connection 8, in the usual and well known way. The tube 6 carries a head 10 to which one end of a link 11 is pivoted at 12. The other end of this link is pivoted at 13 to a floating lever 14. The link 11 preferably includes a turnbuckle 15 in its length, which serves a purpose hereinafter set forth. One end of the floating lever 14 is connected by a pivot 16, with a tail extension 17 of an arcuate rack 18. This rack meshes with a pinion 19 that is fast upon the shaft 20 of pointer 21.

The pointer 21 moves over the face of the dial 22 and coacts with a scale 23 in the usual and well known way. The end of the floating lever 14 remote from the tail extension 17 is connected by a link 24 with an arm 25 of a bell crank lever 26 which has a pivotal mounting at 27.

The compensatory action which is the primary object of the present invention is effected by moving the bell crank lever 26 in accordance with variations in atmospheric pressure. This movement is effected by means of a screw 28 that is threaded into a bearing 29 of the case. This screw has a, preferably, knurled head 30 located exteriorly of the case. The inner end of the screw bars against the extremity 31 of the bell crank lever 26 and a spring 32 tends to draw said extremity against the end of the screw. A pointer 33 mounted concentrically with the pivot 27 coacts with a barometric scale 34 formed upon the dial 22. The parts are so arranged that if, through the medium of the screw 28, the pointer 33 be moved to indicate upon the scale 34, the then prevailing atmospheric pressure as determined by the reading of a separate barometer; the resultant movement imparted to the arcuate rack 18 will act upon the pointer 21 to a sufficient degree to compensate for any change in atmospheric pressure which may have taken place since the previous setting of the pointer 33.

In order that the reason for providing the compensatory action set forth may be fully appreciated, it is pointed out that practically all of the gauges in use at the present time are constructed in such manner as to indicate pressures above and below atmospheric pressure, as a datum. In other words, the zero points of the said gauges correspond to atmospheric pressure instead of corresponding to a complete vacuum. However, since the atmospheric pressure constantly varies, it is manifest that such gauges cannot accurately represent the true absolute pressure existing in the space to which the gauge is connected, because such space has no connection with the atmosphere, and the pressure therein prevailing does not vary with the atmospheric pressure. Therefore, in order to produce a gauge that will be entirely accurate, I so construct the same that the zero point thereof corresponds to a true vacuum and provide, in conjunction with the pointer actuating means consisting of the Bourdon tube 11, floating lever 14, and arcuate rack 18 the means herein shown and described consisting of a link 24, bell crank 26 and the actuating means therefor, which serve to so modify the action of the pointer actuating means as to compensate for variations in atmospheric pressure and to cause the resultant reading of the gauge to indicate the true absolute pressure, without computation, at any given time. Under present conditions, if it is desired to determine an accurate value of the absolute pressure from an ordinary type of gauge, it is necessary to read both the guage and the barometer, whose readings must be reduced to the same units, if they are not already in the same units, and added together, if the pressure measured is above atmospheric pressure. In measuring a pressure which is less than atmospheric, the vacuum gauge is read, the barometer is read and the reading of the vacuum gauge is subtracted from the barometer reading.

It is manifest that the dials may be graduated in many different ways in accordance with the work that the gauge is called upon to do. The pressures may be indicated in any units whatever, English, metric or any other, and in correspondence with the pressure scales, there may be scales of the temperature of vaporization of any substance or scales of any other quantity which varies with and depends upon the temperature, such, for example, as scales of the density of saturated vapor, of total heat or the like.

The pointer 33 serves the function of indicating to the operator when the screw 30 has been turned enough to effect the compensatory action, this point being reached when the pointer 33 indicates upon the scale 34 the then prevailing atmospheric pressure.

As is well known Bourdon tube gauges gradually shift their zero point with age and sustained pressure. The method commonly employed for correcting this is to remove the pointer from the stem and press it on again in a new position, so that the gauge registers correctly. The provision of the turnbuckle 15 renders it possible to calibrate the gauge without removing the pointer.

It is to be understood that the invention is not limited to the precise construction set forth but that it includes within its purview whatever changes fairly come within either the terms or the spirit of the appended claims.

Having described my invention, what I claim is:

1. A gauge comprising a dial, a pressure actuated element, a pointer operable over the dial, connections between the pressure actuated element and the pointer for moving the pointer in accordance with the movements of said pressure actuated element and manually operable settable means for modifying the action of the first named connections upon the pointer to compensate for variations in atmospheric pressure.

2. A gauge comprising a dial, a pressure actuated element, a pointer operable over the dial, connections between the pressure actuated element and the pointer for shifting the pointer in accordance with movements of said element, said connections including a pivoted member and manually operable means for shifting the fulcrum of said pivoted member to thereby modify the action of the said connections upon the pointer to compensate for variations of atmospheric pressure.

3. A structure as recited in claim 2 wherein the manually operable means includes a pointer and a barometric scale upon the face of the dial over which said pointer moves.

4. A structure as recited in claim 2 wherein the manually operable mechanism comprises a pivoted bell crank lever, a link connecting one end of said bell crank lever with and forming the pivotal mounting for said pivoted element, a manually operable screw engaging the opposite end of the bell crank lever, a pointer mounted at the pivot point of the bell crank lever and a barometric scale upon the dial with which said pointer cooperates.

5. A gauge comprising a dial, a pointer operable thereover, there being a pressure scale upon the dial the zero point of which corresponds to a true vacuum and there being a barometric scale upon the dial, a pressure actuated member, connections between said member and the pointer including an arcuate rack, a floating lever pivotally connected to the arcuate rack, a connection between the pressure actuated member and the floating lever, a pivoted lever, a manually operable screw for adjusting the position of the same, a connection between said pivoted lever and the floating lever and a pointer movable with said pivoted lever and coacting with the barometric scale of the dial.

In testimony whereof I hereunto affix my signature.

C. HAROLD BERRY.